(12) United States Patent
Takemoto et al.

(10) Patent No.: US 6,398,648 B1
(45) Date of Patent: Jun. 4, 2002

(54) GAME HALL SYSTEM UTILIZING STORAGE MEDIA WITH ADJUSTMENT MEANS FOR STAKES

(75) Inventors: Takatoshi Takemoto; Kazunari Kawashima, both of Tokyo (JP)

(73) Assignee: Ace Denken Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/929,657

(22) Filed: Sep. 17, 1997

Related U.S. Application Data

(62) Division of application No. 08/507,222, filed on Aug. 17, 1995, now Pat. No. 5,741,184.

(30) Foreign Application Priority Data

Feb. 17, 1993 (WO) .............................. PCT/JP93/00193

(51) Int. Cl.[7] .................................................. A63F 9/24
(52) U.S. Cl. .............................. 463/35; 463/16; 463/43
(58) Field of Search .............................. 463/20, 25, 26, 463/27, 28, 29, 40, 41, 42, 43, 44, 16; 700/91, 92, 93; 273/121 B, 143 R

(56) References Cited

U.S. PATENT DOCUMENTS

| | | | |
|---|---|---|---|
| 4,072,930 A | 2/1978 | Lucero et al. | 340/152 T |
| 4,448,419 A | * 5/1984 | Telnaes | 213/143 R |
| 4,575,622 A | 3/1986 | Pellegrini | 235/382 |
| 4,611,808 A | 9/1986 | Palmer | 273/138 A |
| 5,083,271 A | 1/1992 | Thacher et al. | 364/411 |
| 5,179,517 A | 1/1993 | Sarbin et al. | 364/410 |
| 5,265,874 A | 11/1993 | Dickinson et al. | 273/138 A |

FOREIGN PATENT DOCUMENTS

| | | |
|---|---|---|
| EP | 0 360 613 | 3/1990 |
| GB | 2 187 020 | 8/1987 |
| GB | 2278007 | * 11/1994 |
| JP | 59-108581 | 6/1984 |
| JP | 61-238271 | 10/1986 |
| JP | 63-126087 | 5/1988 |
| JP | 63-163688 | 7/1988 |
| JP | 63-197476 | 8/1988 |
| JP | 63-207222 | 8/1988 |
| JP | 1-142995 | 6/1989 |
| JP | 2-63265 | 3/1990 |
| JP | 2-114729 | 4/1990 |
| JP | 2-104421 | 8/1990 |
| JP | 2-231927 | 9/1990 |
| JP | 3-276934 | 12/1991 |
| JP | 07-100258 | 4/1995 |
| JP | 07-132170 | 5/1995 |
| JP | 07-144059 | 6/1995 |
| JP | 08-112430 | 5/1996 |
| JP | 08-229220 | 9/1996 |
| WO | WO 89/01671 | 2/1989 |
| WO | WO 92/20415 | 11/1992 |

* cited by examiner

*Primary Examiner*—Michael O'Neill
(74) *Attorney, Agent, or Firm*—SEED IP Law Group PLLC

(57) ABSTRACT

A game hall system having a plurality of game machines 120 each of which is equipped with a game execution section 131 for executing a game; comprising storage media 110 in each of which information items about the game are stored; the game machine 120 including a transmission/reception section 136 which transmits and receives information to and from the storage medium; the transmission/reception section 136 including a setting port 123 in which the storage medium is set, a transmitter/receiver 121 which transmits and receives by radio to and from the set storage medium, a controller 135 which controls the transmission and reception of the transmitter/receiver and controls transmission and reception to and from the execution section, and memory means 128 for storing transmitted and received information therein; the storage medium 110 including a transmitter/receiver which transmits and receives by radio to and from the game machine having the storage medium set therein, a controller 119 which controls the transmission and reception of the transmitter/receiver, and a memory portion 118 which stores transmitted and received information therein.

8 Claims, 9 Drawing Sheets

GAME HALL SYSTEM UTILIZING STORAGE MEDIA WITH ADJUSTMENT MEANS FOR STAKES

CROSS-REFERENCE TO RELATED APPLICATION

This application is a divisional application of U.S. patent application Ser. No. 08/507,222, filed Aug. 17, 1995 now U.S. Pat. No. 5,741,184.

TECHNICAL FIELD

The present invention relates to a game hall system utilizing storage media.

BACKGROUND ART

Generally, in a game hall, a plurality of game machines are arranged together with at least one adjustment device which performs the delivery of a prize, etc. on the basis of a game result. In recent years, regarding such a game hall, there has been proposed, for example, one wherein the progress of a game in the game machine is recorded in a magnetic card which has a data recording function and which has been purchased beforehand, and wherein information items recorded in the magnetic card are read by the adjustment device so as to manage a game situation or exchange game media for a prize in conformity with the read information items. A prior-art example concerning this game hall is a technique disclosed in the pamphlet of PCT Publication WO92/20415. According to the prior-art technique, in a game apparatus having a game execution section with which a game is played by the use of game media, and a game-media holder in which the game media for use in the game are temporarily held, the number of game media which are handled during the execution of the game is managed, and the managed number of game media is recorded into a card, being a storage medium, by a write circuit.

With the prior-art technique, however, the identical magnetic card cannot be used many times due to heavy wear in the case of recycling it when the number of game media written in the magnetic card has become zero or after the game media have been exchanged for a prize by reading the number thereof by means of an adjustment device. Therefore, the card is usually disposed of after having been utilized once, which poses an environmental problem. Another problem is that since a new card is issued for every game player, the technique results in a high cost.

Moreover, the information items of the card are directly read and written by read and write circuits, respectively, so that inferior contact with the card is to be expected.

DISCLOSURE OF THE INVENTION

The present invention has been made in order to solve the problems stated above, and has for its object to provide a game hall system which can utilize recyclable storage media. Another object is to provide a game hall system in which inferior contact with a storage medium is not experienced when reading/writing the information thereof.

In order to accomplish the aforementioned objects, a game hall system having a plurality of game machines each of which is equipped with a game execution section for executing a game, consists in comprising storage media in each of which information items about the game are stored; the storage medium including a storage-medium transmitter/receiver which transmits and receives by radio, a storage-medium controller which controls the transmission and reception of the storage-medium transmitter/receiver, a memory portion in which the information items transmitted and received by the storage-medium transmitter/receiver are stored, and a power supply circuit which is chargeable; each of the game machines including a game-machine transmission/reception section which transmits and receives information to and from the storage medium, and a game-machine controller which controls the transmission and reception of the game-machine transmission/reception section and controls the execution section; the game-machine transmission/reception section including a game-machine-side setting port in which the storage medium is set, a game-machine transmitter/receiver which transmits and receives by radio to and from the storage medium set in the game-machine-side setting port, and a charging circuit which charges the power supply circuit of the storage medium set in the game-machine-side setting port.

It is possible that the game machine further includes a setting switch which serves to set an amount of money to be spent on a game, and an end switch which serves to give a command for ending the game; that, in compliance with manipulation of the setting switch, the execution section operates so as to execute the game within a range of the set amount of money and processes data originating with the execution of the game; that, in compliance with manipulation of the end switch, the game-machine controller transmits results of the data processing of the execution section to the storage medium through the game-machine transmitter/receiver; and that the storage-medium controller stores the data processing results received by the storage-medium transmitter/receiver, in the memory portion.

Each of the storage-medium transmitter/receiver and the game-machine transmitter/receiver may well include error detection means for detecting any error during the transmission and reception of the information.

It is also allowed that the storage-medium controller transmits the data processing results stored in the memory portion, through the storage-medium transmitter/receiver; and that the game-machine controller includes judgement means for judging whether or not the data processing results received from the storage medium by the game-machine transmitter/receiver agree with the transmitted data processing results.

Further, the power supply circuit of the storage medium is charged by the charging circuit when held set in the setting port of the game machine. Besides, the charging circuit can perform the charging even during the transmission and reception between the storage-medium transmitter/receiver and the transmitter/receiver of the game machine.

It is also allowed that the storage-medium controller detects a charged state of the power supply circuit, and that it further transmits information indicative of the detected charged state, through the storage-medium transmitter/receiver during the transmission and reception; and that the game-machine controller includes detection means for detecting whether or not the information indicative of the charged state of the storage medium as received by the game-machine transmitter/receiver is abnormal or not. Thus, the presence of any charging abnormality can be detected. It is consequently possible to judge if the data written in the IC card are correct.

Further, the storage medium may well include display means for displaying the data processing results. A liquid-crystal screen or the like can be included as the display means.

It is possible that the game-machine-side setting port detects the setting of the storage medium; that, when the setting of the storage medium has been detected in the game-machine-side setting port, the game-machine controller gives a command to the storage medium through the game-machine transmitter/receiver so as to transmit the information stored in the memory portion; and that, when the storage-medium-controller has been commanded, through the storage-medium transmitter/receiver, to transmit the information by the game-machine controller, the storage-medium controller thereof transmits the information stored in the memory portion.

It is possible that the game-machine controller gives a command to the storage medium through the game-machine transmitter/receiver so as to erase the information stored in the memory portion; and that, when the storage-medium controller has been commanded to erase the information by the game-machine controller through the storage-medium transmitter/receiver, the storage-medium controller thereof erases the information stored in the memory portion.

It is possible that the game-machine controller gives a command to the storage medium through the game-machine transmitter/receiver so as to "OFF"/"ON" operate a power supply of the power supply circuit; and that, when the storage-medium controller has been commanded to "OFF"/"ON" operate the power supply by the game-machine controller, the storage-medium controller thereof controls the "OFF"/"ON" operation of the power supply of the power supply circuit through the storage-medium transmitter/receiver.

It is also possible to further comprise an adjustment device which includes adjustment means for adjusting stakes for the game; the adjustment device including an adjustment-device-side setting port in which the storage medium is set, an adjustment-device transmitter/receiver which transmits and receives by radio to and from the storage medium set to the adjustment-device-side setting port, an adjustment-device controller which controls the transmission and reception of the adjustment-device transmitter/receiver and controls transmission and reception to and from the adjustment means; the adjustment means adjusting the stakes on the basis of transmitted and received information by the adjustment-device transmitter/receiver. It is possible that the adjustment device further includes an output unit which, at least, outputs the transmitted and received information by the adjustment-device transmitter/receiver.

It is also possible to further comprise a monitoring device which monitors withdrawal of the storage medium from a game hall; the monitoring device including a monitoring device transmitter/receiver which transmits and receives by radio to and from the storage medium lying within a predetermined range, a monitoring device controller which controls the transmission and reception of the monitoring device transmitter/receiver, and detection means for detecting the withdrawal of the storage medium from the game hall; the storage-medium transmitter/receiver transmitting and receiving by radio to and from the monitoring device transmitter/receiver.

It is possible that the detection means sends a monitor signal from the monitoring device transmitter/receiver, and detects the withdrawal from the game hall when a response signal from the storage medium has been received; and that the storage-medium transmitter/receiver transmits the response signal when it has received the monitor signal from the monitoring device transmitter/receiver.

Besides, the monitoring device can further include output means for giving a warning when the withdrawal of the storage medium from the game hall has been detected by the detection means.

It is also allowed that the monitoring device further includes a door controller which is arranged at an entrance and exit of the game hall, and which controls opening and shutting of a door at the entrance and exit; and that the door controller shuts the door when the withdrawal of the storage medium from the game hall has been detected by the detection means.

Further, it is possible to comprise storage-medium issue means for issuing the storage media.

In addition, it is possible that at least some of the game machine includes a lending machine which lends out game media, the game execution section executing the game through the use of game media; and that the storage-medium issue means, the game-machine-side setting port and the game-machine transmitter/receiver are provided in the lending machine.

Besides, it is allowed that the game machines includes detection means for detecting a predetermined execution state of the game machine; that, when the predetermined execution state has been detected by the detection means, the game-machine controller transmits the data processing results of the execution section to the storage medium through the game-machine transmitter/receiver; and that the storage-medium controller stores, in the memory portion, the data processing results received by the storage-medium transmitter/receiver.

In the game machine, the game-machine controller controls the execution section and also controls the transmission and reception of the game-machine transmitter/receiver, and the game-machine transmitter/receiver transmits and receives by radio to and from the storage-medium transmitter/receiver set in the game-machine-side setting port. In the storage medium, the storage-medium controller controls the transmission and reception of the storage-medium transmitter/receiver, and the memory portion stores therein the information items transmitted and received by the storage-medium transmitter/receiver. The charging circuit can charge the power supply circuit of the storage medium set in the game-machine-side setting port. Besides, the power supply circuit can include induced-power generation means for generating an electromotive force on the basis of electromagnetic induction of a magnetic field, and accumulation means for accumulating therein the electromotive force generated by the induced-power generation means, while the charging circuit can include magnetic-field generation means for generating the magnetic field.

Since, in this manner, the storage medium and the game machine communicate by radio, inferior contact in the operation of reading or writing data from or into the storage medium does not take place. Moreover, since the storage medium can update the stored information by the transmission and reception, it is recyclable, and an economical game hall system can be realized. Further, when the storage medium is held set in the game-machine-side setting port, the power supply circuit thereof can be charged.

BEST MODE FOR CARRYING OUT THE INVENTION

Now, an embodiment of the present invention will be described with reference to the drawings. First, the entire game hall system in the embodiment will be described, followed by the detailed description of the construction and operation of an IC card as well as a game apparatus.

Figure 10:
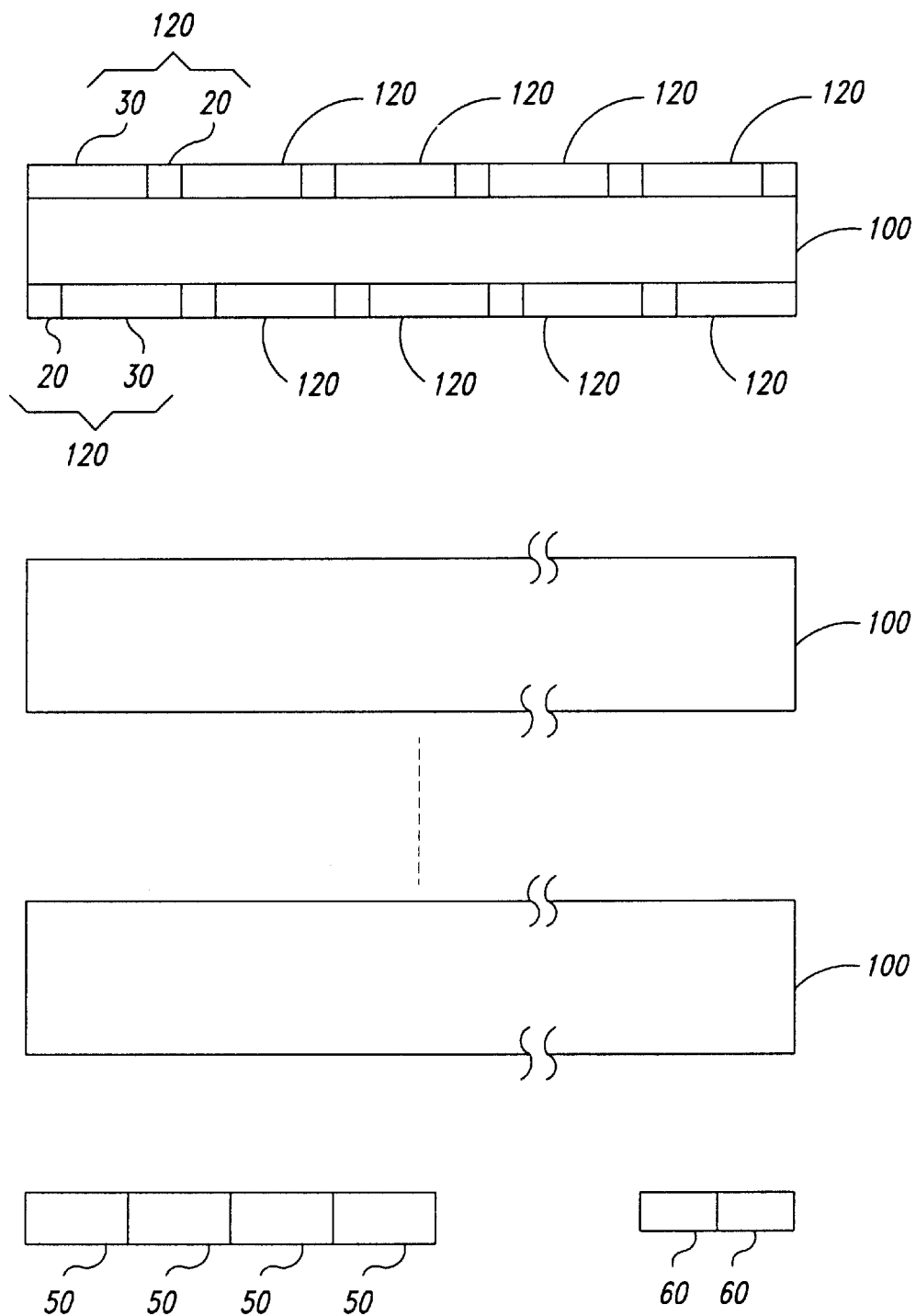
FIG. 10 is a view of the whole layout of the game hall.

FIG. 10 illustrates the overall layout of the game hall system in the embodiment of the present invention. In a game hall shown in FIG. 10, there are juxtaposed a plurality of groups 100 in each of which the plurality of game apparatuses 120 are arrayed in one or two rows. Further, a plurality of prize card reading machines 60 are arranged. The game apparatus 120 is a game machine such as pachinko (Japanese upright pinball game) or slot machine, which includes a game execution section for executing a game. The game apparatus 120 includes a game-media lending machine 20 which lends out game media. The game-media lending machine 20 can include storage-medium issue means for issuing a storage medium, a setting port for setting the storage medium therein, and a transmission/reception section for transmitting and receiving to and from the storage medium. Alternatively, the storage-medium issue means provided in the game-media lending machine 20 may well be replaced with a storage medium vending machine 50 being a storage-medium issue device which stores information in a storage medium and then issues the storage medium having the information stored therein.

The storage medium vending machine 50 includes an input unit which accepts an equivalent for the execution of the game, a transmitter/receiver which transmits and receives information on the equivalent, by radio to and from the storage medium, a controller which controls the transmission and reception of the transmitter/receiver, and an issue portion which issues the storage medium. It ejects the IC card being the storage medium in which the information items of the amount of money and the number of game media are stored. The prize card reading machine 60 reads the stored contents of the IC card in order to exchange the game media for a prize. This prize card reading machine 60 functions as an adjustment device which includes adjustment means for adjusting stakes on the game. In this embodiment, the IC card is utilized as the storage medium, the "number of game media" information, etc. to be stated later can be stored in the IC card, and a transmission/reception section of non-contacting type is employed for reading and writing the information items from and into the IC card. More specifically, the game apparatus 120 being the game machine has the transmission/reception section which transmits and receives the information items to and from the storage medium. This transmission/reception section includes a setting port in which the storage medium is set, a transmitter/receiver which transmits and receives by radio to and from the set storage medium, a controller which controls the transmission and reception of the transmitter/receiver and which controls transmission and reception to and from the execution section, and memory means for storing the transmitted and received information items therein. The storage medium includes a transmitter/receiver which transmits and receives by radio to and from the game machine having the storage medium set therein, a controller which controls the transmission and reception of the transmitter/receiver, and a memory portion which stores the transmitted and received information items therein. A hall computer for managing the entire game hall may well be further comprised so as to manage the working situations of the individual game apparatuses, the presence of any abnormality, etc.

Figure 1:
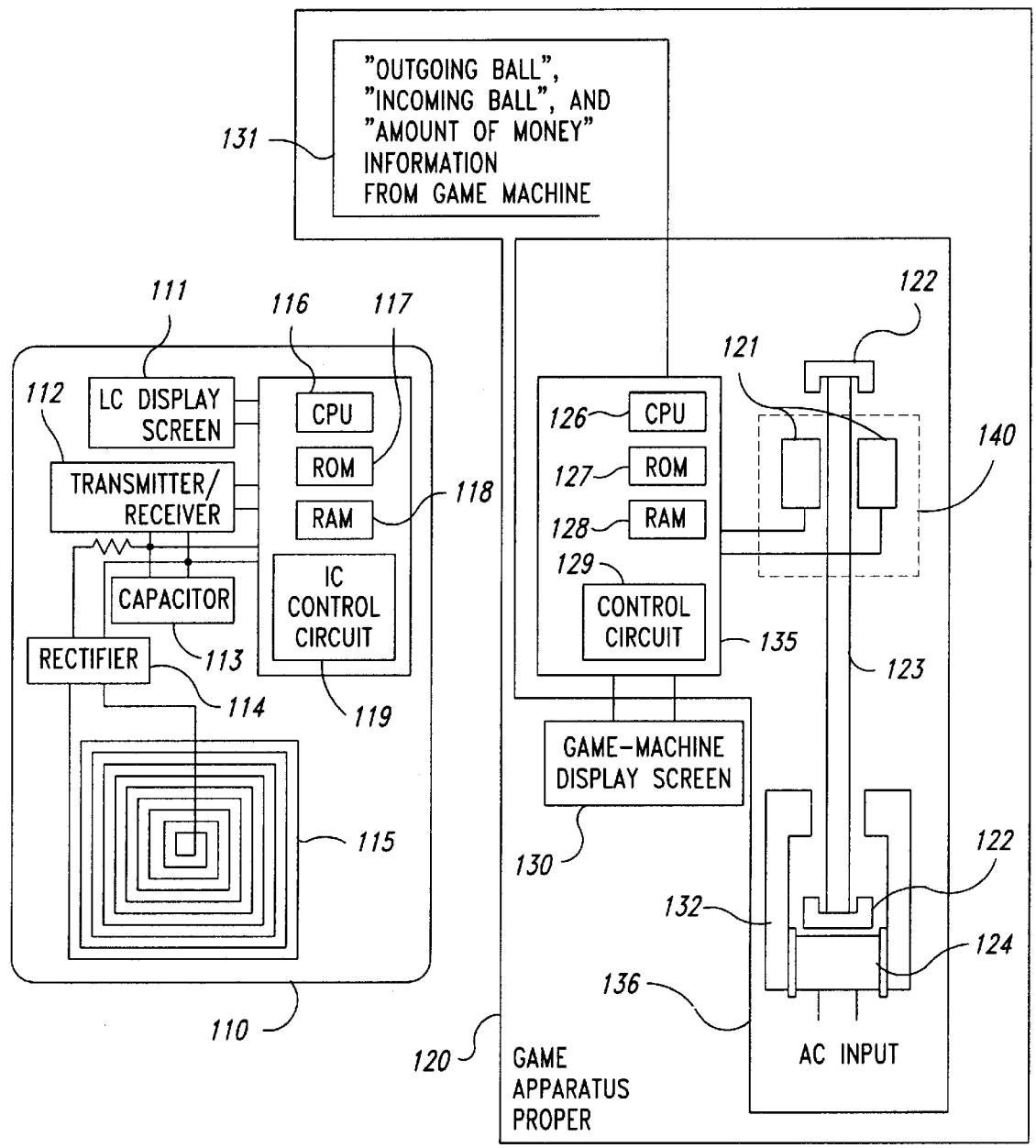
FIG. 1 is a block diagram showing the construction of a storage medium and that of a game machine side in the present invention.

Next, the construction of the IC card will be described with reference to FIG. 1. FIG. 1 illustrates the construction of the storage medium and one portion of a game apparatus in this embodiment. In FIG. 1, the IC card 110 includes a liquid-crystal display screen 111 which is display means for displaying the "number of game media" information, etc. stored, the transmitter/receiver 112 which serves to transmit and receive signals to and from the game apparatus proper, a rectifier 114 which rectifies an AC voltage into direct current, a capacitor 113 which is a power supply circuit for storing electric charge, a coil 115 which serves to charge the power supply circuit, a CPU 116 which is processing means for performing the operations using the stored "number of game media" information, etc., a ROM 117 which is memory means for storing the programs of predetermined processing steps, etc. therein. a RAM 118 which is memory means for storing therein the "number of game media" information, etc. that are to be transmitted and received, and a control circuit 119 which is control means for controlling the transmission and reception of the transmitter/receiver 112 of the IC card and controlling the display of the liquid-crystal display screen 111.

Figure 2:
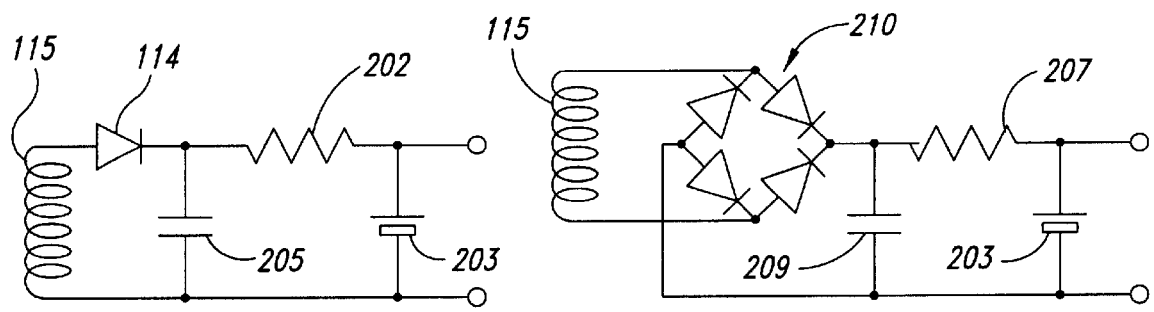
FIG. 2 is a diagram of the circuit arrangements of chargeable IC cards.

Referring to FIG. 1, the rectifier 114 functions to rectify the AC input and supply it to the capacitor where the DC voltage is accumulated. The capacitor 113 is a super-capacitor or the like which is usable as a substitute for a battery, and it has a capacity sufficiently large to fulfill the functions of the card for a fixed time period, for example, about 15 hours even when the power supply has been cut off. The coil 115 is connected on the AC input side of the rectifier 114. An electromotive force is generated by externally applying an alternating magnetic field to the coil 115. Thus, the capacitor is charged when the IC card is situated in the game apparatus proper, as will be stated later. It is rapidly charged with the supply voltage for one day at the aforementioned stage. Herein, the capacitor may well be replaced with a battery such as button type mercury cell by detaching the coil 115 and the rectifier 114. Alternatively, a solar cell may well be used instead of the coil and the rectifier. In this case, light is afforded instead of the alternating magnetic field. Besides, the capacitor may well be replaced with a chargeable battery as shown in FIG. 2. Even in the case of the chargeable battery, as in the case of the capacitor, an electromotive force is generated by externally applying an alternating magnetic field to the coil 115, and the generated AC electromotive force is rectified by the rectifier 114 or a bridge 210 so as to charge the battery 203. Supply voltages are fed from the capacitor 113 to the IC control circuit 119, the transmitter/receiver 112, etc.

The controller can be constituted by the IC control circuit 119 and the CPU 116. Besides, the liquid-crystal display screen 111 and the transmitter/receiver 112 are connected to the controller.

Figure 3:
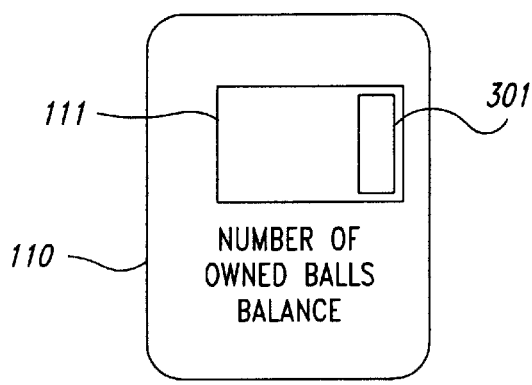
FIG. 3 is an explanatory view showing a display example of the IC card.

Moreover, the display means is not restricted to only the liquid-crystal display screen, but a display based on an LED or the like may well be presented. A display example of the liquid-crystal display screen is illustrated in FIG. 3. As shown in FIG. 3, the liquid-crystal display screen may well display the number of owned balls indicating the number of game media, the balance (remaining stakes), etc. and indicate the charged state of the capacitor 113. Regarding the charged state, when the supply voltage stored in the power supply circuit is greater than a preset voltage, nothing is displayed on the liquid-crystal display screen. However, when the stored supply voltage has become lower than the preset voltage, a square or the shape of the battery is displayed on part of the liquid-crystal display screen, characters such as "充電" (charge) or "電池" (battery) are displayed therein, and the character display and/or the frame are flickered. For the flickering, there are such methods as flickering only the frame, only the characters, the frame and the characters alternately, and the frame and the characters simultaneously. On this occasion, the characters such as "充電" or "電池" may well be placed in which characters on the blackened square or the shape of the battery.

The transmitter/receiver uses a system based on radio waves or a system based on light, and it does not interchange signals in touch with any external device through terminals or the likes.

Figure 7:
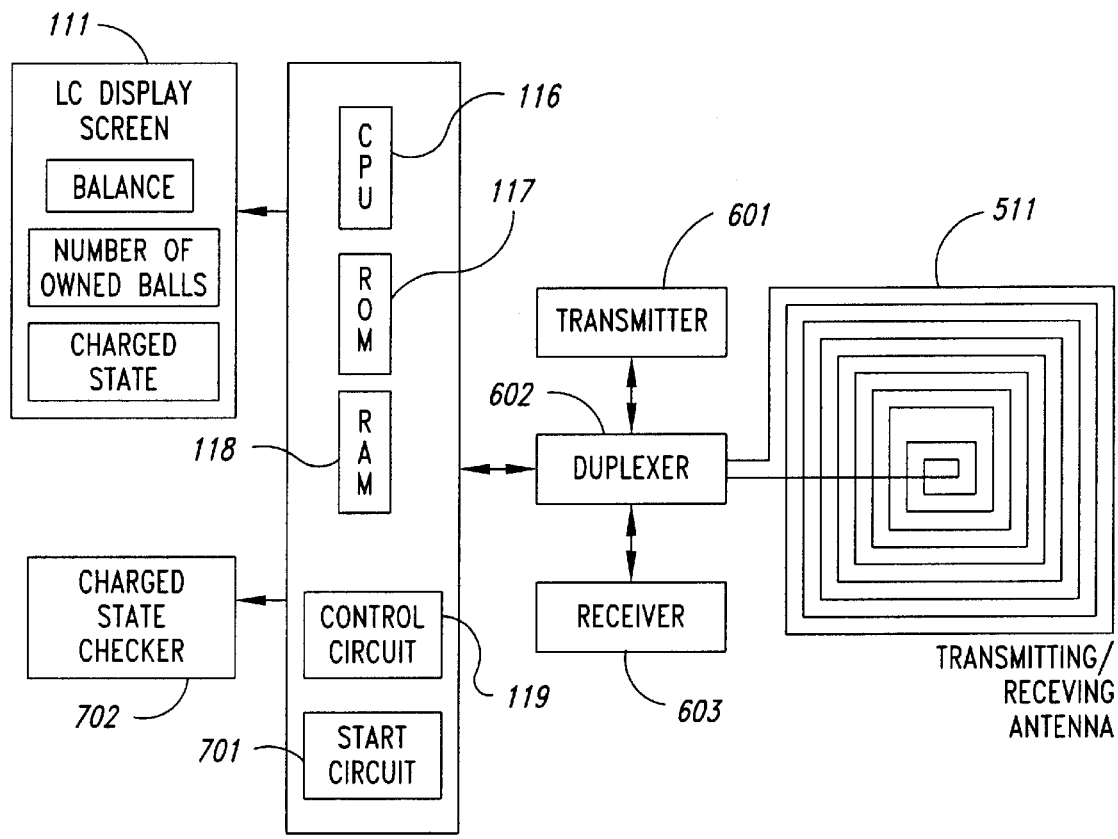
FIG. 7 is a block diagram showing a transmission/reception method in the IC card.

A block diagram of the IC card in the case of the transmission and reception by radio waves will be explained with reference to FIG. 7. In FIG. 7, the same numerals are assigned to components which have functions similar to those of the components shown in FIG. 1. As shown in FIG. 7, the transmitter/receiver 112 depicted in FIG. 1 includes a transmitter 601 which serves to modulate transmission data and to transmit the modulated signals, a receiver 603 which receives and demodulates the signals, a duplexer 602 which serves to change-over the transmitter 601 and the receiver 603, and a transmitting/receiving antenna 511.

On the other hand, in the case of transmission and reception using light, the transmitting/receiving antenna 511 is substituted by a light emitting element such as a light emitting diode and a light receiving element such as a photodiode. Besides, in a case where a monitoring device which monitors the withdrawal of the IC card, as will be explained later, is installed in the game hall, the transmitter/receiver of the IC card may well transmit and receive using light to and from the game apparatus, and by radio to and from the monitoring device. Any of AM modulation, FM modulation, etc. is previously determined as a modulation technique in the transmitter 601 and the receiver 603. Besides, in a case where a transmitter and a receiver are separately mounted for simultaneous communications, they may well have different modulation methods. A sequence as is used in the data transfer of a packet or the like is previously determined as a transmission/reception protocol. In the case of performing the packet communications or the asynchronous communications, START and END signals being the delimiters of data may well be affixed.

When set in any of the card setting ports of the game apparatus proper, etc., the IC card in this embodiment picks up an external signal by means of the transmitting/receiving antenna 511 and has data sent to the controller, the data having been received and demodulated by the receiver 603. The control circuit 119 of the controller judges whether or not the data is a predetermined start signal, and subject to the start signal, it starts the subsequent operation and transmits a signal of start completion. In addition, it judges whether or not the data is a predetermined reset signal, and subject to the reset signal, it clears the content of the RAM 118. In a case where new data have been received, the data of the RAM 118 are updated, and the new data are displayed on the liquid-crystal display unit. Besides, the data recorded in the RAM 118 are transmitted in compliance with a data transmission instruction given from outside. The data to be stored in the RAM 118 or to be transmitted therefrom contain the number of owned balls, being information on the number of game media, the balance, the date and time of use, a security symbol, the number (No.) of the game apparatus, the No. of the IC card, the charged state, and so forth. The security symbol is predetermined specific encryption information, by which the transmitter/receiver of any other than game apparatuses other than the pertinent game hall is made incapable of transmission and reception. The security symbol may be affixed to transmission/reception data on each occasion, or it may well be transmitted or received at the beginning of transmission/reception. Alternatively, for the purpose of security, a scrambler and a descrambler may well be provided so as to scramble and descramble the transmission/reception data in the operations of the modulation and demodulation, respectively.

In addition, a charged-state check function 702 is included. In the case of insufficient charging, this state is displayed on the display unit of the card, and information indicative of this state is also transmitted outside of the card. Therefore, the IC card can function without including the CPU in the controller thereof. Besides, in a case where the IC card in a data reset state is not set in the game apparatus proper, it is also allowed, for minimizing the consumption of the battery, that only the receiver is kept actuated with the operations of the display of the liquid-crystal display screen, etc. stopped and with the power supply turned "OFF". In this case, the IC card may well be furnished with a power supply switch. Herein, the IC card is so contrived that the operations of the display of the liquid-crystal display screen, etc. are performed while the power supply switch is "ON", and that the power supply switch is automatically brought into the "ON" state when the IC card has been set in the game apparatus proper.

Next, the construction of the game apparatus proper will be described with reference to FIG. 1 and FIG. 11. The front view of the game apparatus proper is illustrated in FIG. 11.

Figure 11:
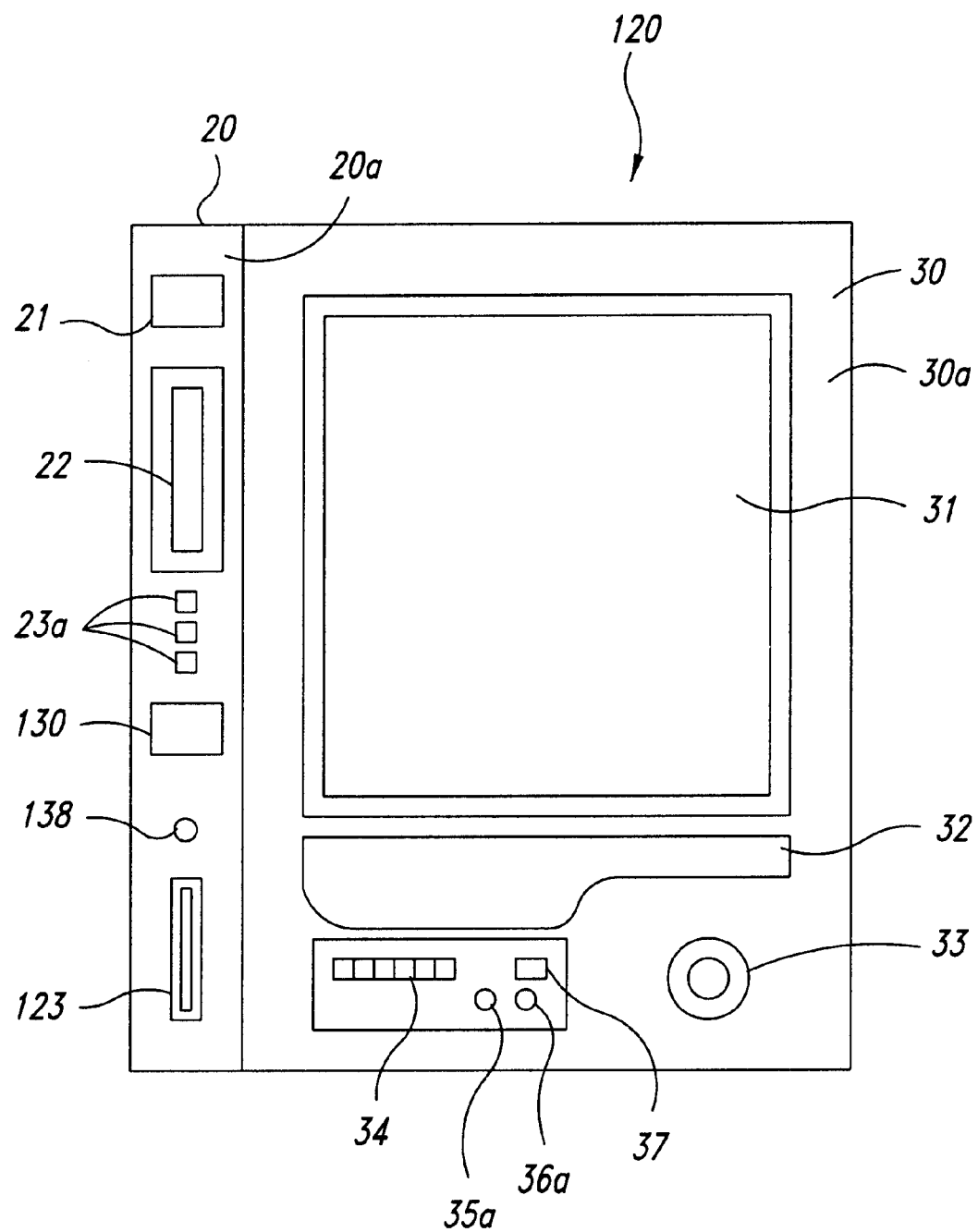
FIG. 11 is a front view of the game machine.

In FIGS. 1 and 11, the game apparatus 120 in this embodiment has the game machine body 30 including the game execution section 131 with which the game is played using the game media. and the transmission/reception section 136 by which the information items about the game media for use in the game are transmitted and received to and from the IC card. In addition, the game apparatus 120 may well further include the game-media lending section 20 which functions to lend out the game media. The game machine body 30 is so constructed as to transfer signals between it and the game-media lending section 20 and to lend out the game media and adjust the stakes. Besides, when a specified condition has been met during the playing of the game using the game media contained in a lent-media holder 32, the game execution section 131 of the game machine body 30 awards a prize and produces information (or a signal) for giving a predetermined number of game media to the player of the game apparatus.

The game machine body 30 is provided at the front 30a with a panel board 31 which forms a game region, the lent-media holder 32 in which the game media for use in the game are temporarily held, and a handle 33 which is manipulated for protecting the game medium contained in the lent-media holder 32 onto the panel board 31. The panel board 31 is so constructed that the game player can see the state of the game which is played using the game media. In addition, the game machine body 30 includes a number indication portion 34 which indicates the number of the game media owned by the player currently playing with the particular game apparatus 120 (hereinbelow, this number shall be simply called the "number of owned game media"), a manipulation element 35a for a resupply switch, a manipulation element 36a for an adjustment switch, and a game-over indication lamp 37 which serves to notify the end of the work of the particular game apparatus 120. The number indication portion 34 can be employed for indicating, not only the number of the owned game media, but also the number of game media lent out, the number of game media having overflown among the game media resupplied into the lent-media holder 32, etc. When no game medium has come to exist in the lent-media holder 32 in spite of the presentation of the number indication, the game media can be resupplied into the lent-media holder 32 within the indicated number by manipulating the resupply-switch manipulation element 35a. The game-over indication lamp 37 notifies the player of the game-over state by lighting-up or flickering.

The game machine body 30 in this embodiment has, for example, a pachinko game machine or a slot machine as the game execution section 131. The panel board 31 and the handle 33 are constituents of the game execution section 131. The game media which are used in the game-media lending machine 20 and the game machine body 30, are metal balls called "pachinko balls" in the case of the pachinko game machine. Coins or medals are used in the case of the slot machine. Generally, in a game hall, game media need to be borrowed when playing a game. When borrowing the game media, it is necessary to pay an equivalent in some form. In this embodiment, the paid amount of money and the number of borrowed game media, etc. are managed in the game apparatus, and they are stored in the IC card when the end switch is manipulated or when the game is over. Hereinbelow, such a method shall be termed the "semi-prepaid card method". With the semi-prepaid card method, by way of example, a note or paper money is accepted through slit 22, and the amount of money is displayed on a display unit. Further, when the number of game media to be lent out or the amount of money is specified by manipulating lending-switch manipulating elements 23a, the game media are lent out, the paid-out amount of money is subtracted from the inserted amount of money, and the resulting amount of money is displayed on the display unit. The number of game media lent out and the number of game media dealt with by the execution of the game are managed, and the game can be continued until all the game media corresponding to the inserted amount of money are lent out. Besides, when the end switch is depressed or when the game ends due to predetermined game processing, the "number of game media" information and the amount of money are stored in the IC card, and the IC card is ejected out of a card setting port 123. Since the IC card includes the liquid-crystal display unit, the amount of the balance and the number of acquired game media can be displayed thereon. In the case of executing the game in another game apparatus, the IC card is set in the card setting port 123 of this game apparatus. The IC card and the game apparatus transmit and receive data by radio. Moreover, the balance can be returned, or the game media can be exchanged for a prize or the amount of money corresponding to the number of these game media, in such a way that the IC card is set in the adjustment device of the prize exchange so as to communicate therewith.

In addition, the IC card may well be purchasable at the storage medium vending machine 50 shown in FIG. 10. In this case, the storage medium vending machine 50 accepts a note, stores the amount of money of the accepted note in the IC card and ejects the IC card. The ejected IC card can be similarly dealt with by setting it in the game apparatus.

Besides, the game-media lending machine 20 transmits and receives signals to and from the game machine body 30 so as to perform a process for accepting the lending of game media and a process for adjusting stakes. This game-media lending machine 20 is provided at the front 20a with a pilot lamp 21, the slit 22 for a note, the setting port 123 for the IC card 110, the lending-switch manipulation elements 23a, the "amount of money" display unit 130 and an adjustment switch manipulation element 138.

The slit 22 is a port into which the note or the like is inserted. On the other hand, the card setting port 123 has the IC card 110 set therein so that information stored in this IC card 110 may be received and information to be stored in this IC card 110 may be transmitted. Furthermore, the card setting port 123 includes a mechanism for holding a plurality of IC cards.

The lending-switch manipulation elements 23a are for externally manipulating a selector switch 23 which serves to send the game machine body 30 information (or a signal) indicating the number of game media to-be-lent-out or the amount of money corresponding thereto. In this embodiment, the manipulation elements 23a are configured of three pushbuttons in correspondence with the amount of money of notes. Here in this embodiment, the three pushbuttons correspond to the amounts of money of, for example, the three sorts of notes of 1000 yen, 5000 yen and 10000 yen.

In the present invention, as the game media which are lent out, a prescribed unit number of game media are supplied from within the game apparatus 120 directly into the game-media holder 32 by unshown supply means in compliance with the game player's request. The number of supplied game media becomes the number of owned balls, and the remaining amount of money is set as the balance. Besides, the game media acquired by the game are not, per se, delivered to the game player, but the number of acquired game media is added to the number of owned balls, and the amount of money left unspent is finally recorded as the balance in the IC card.

Next, the transmission/reception section 136 of the game apparatus will be described. Referring to FIG. 1, the transmission/reception section 136 includes a transmitter/receiver 121 which functions to transmit and receive signals to and from the IC card, the card housing 123 which functions to set the IC card therein, guide members 122 which serve to set the IC card, a coil 124 and a core 132 which constitute a charging circuit for storing the power supply of the IC card, the display screen 130 which is display means for displaying the stored information items about the numbers of game media, etc., a CPU 126 which is processing means for performing the operations of the stored information items about the numbers of game media, etc., a ROM 127 which is memory means for storing therein programs such as predetermined processing steps, a RAM 128 which is memory means for storing therein the information items about the numbers of game media, etc. that are to be transmitted and received. and a control circuit 129 which is control means for controlling the transmission and reception of the transmitter/receiver 121 and the display of the display screen 130. In addition, the outer side of the transmitter/receiver may well be enclosed with a radio wave absorber 140 such as carbon. Thus, it is possible to prevent multiple reflection within the particular game apparatus and to reduce influence on any other game apparatus. It is also possible to prevent the influence of external noise.

The guide members 122 function to allow smooth insertion and removal of the IC card, and they have a mechanism adapted to slide. When the card is inserted, the guide members 122 slide to fasten this card. Further, when commanded by the control circuit 129, the guide members 122 slide to unfasten the card. A microswitch or photoelectric switch is disposed at the innermost part of the card setting port 123. The microswitch turns "ON" when touched by an end part of the IC card during the insertion thereof. Thus, the insertion of the IC card can be sensed in the card setting port 123. Further, in the set state of the IC card, the core 132 carrying the coil 124 for an AC input lies at the position of the IC card corresponding to the coil 115. Herein, when the alternating current is caused to flow through the coil 124, an alternating magnetic field is generated in the core 132. An AC electromotive force is generated in the coil 115 of the IC card by the alternating magnetic field. The generated AC electromotive force is rectified by the rectifier 114, and the resulting voltage is stored in the capacitor 113 so as to be used as the power supply.

Moreover, in the set state of the IC card, the transmitter/receiver 121 of the body lies at the position of the IC card corresponding to the transmitting/receiving antenna 511. This transmitter/receiver 121 of the body may either be built into the body or externally mounted. It is connected to the control circuit 129. The controller can be constituted by the control circuit 129 and the CPU 126. Alternatively, the controller may well be included in the game execution section 131.

Figure 6:
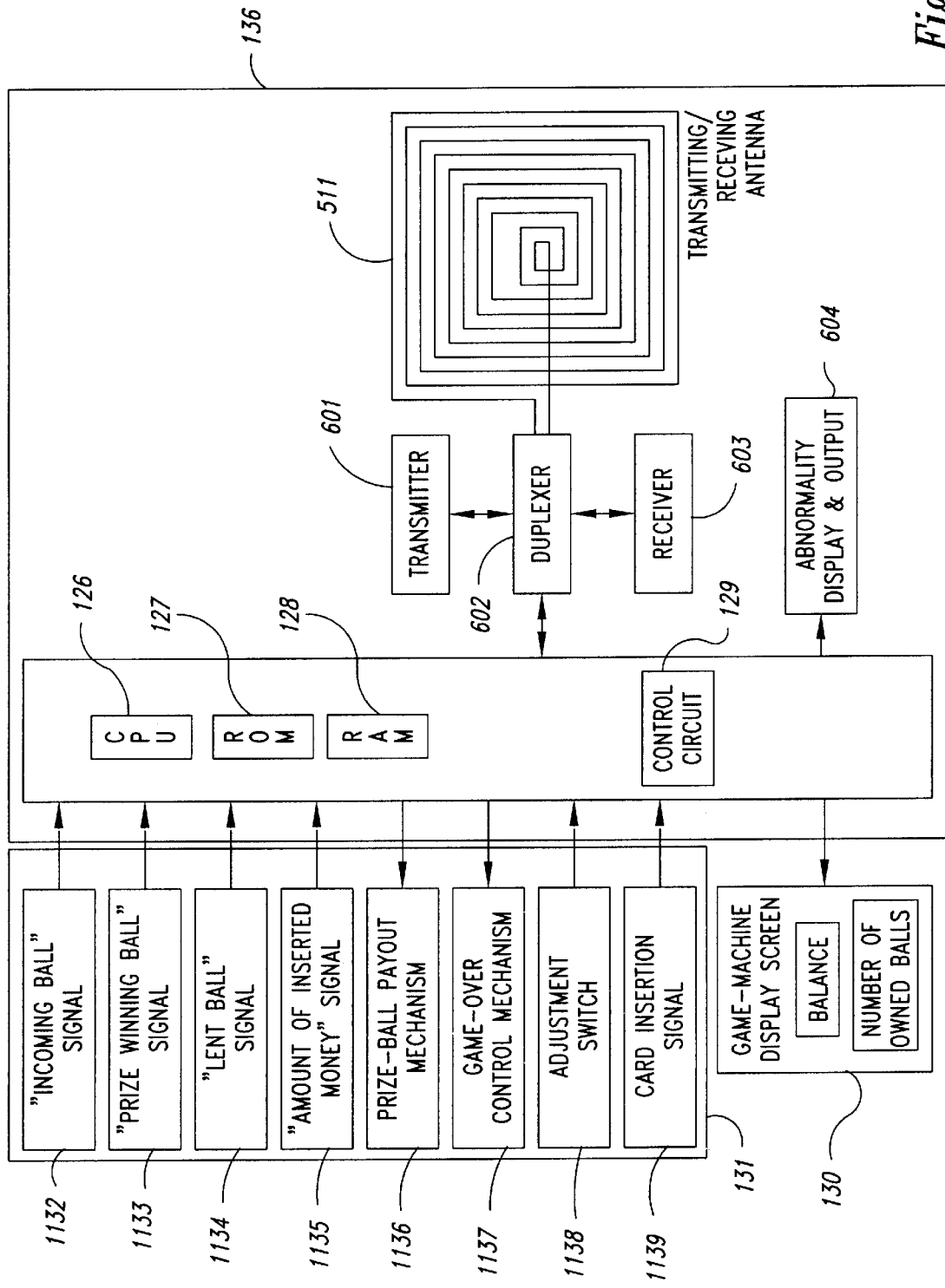
FIG. 6 is a block diagram showing a transmission/reception method in a game machine.

The block diagram of the game apparatus in the case of the transmission and reception by radio will be described in detail with reference to FIG. 6. In FIG. 6, the same numerals are assigned to components which have functions similar to those of the components shown in FIG. 1. As shown in FIG. 6, the transmitter/receiver 121 depicted in FIG. 1 includes a transmitter 601 which serves to modulate transmission data and to transmit the modulated signals, a receiver 603 which receives and demodulates the signals, a duplexer 602 which serves to change-over the transmitter 601 and the receiver 603, and a transmitting/receiving antenna 511. Also, in the game execution section 131, the proceeding of the game is controlled, and various signals are interchanged with the controller 135.

As sorts of signals, there are an "incoming ball" signal 1132 which indicates the presence of an incoming ball, a "prize-winning ball" signal 1133 which indicates the presence of winning a prize, a "lent ball" signal 1134 which indicates the presence of lending balls, an "amount of inserted money" signal 135 which indicates the amount of money inserted into the game apparatus, the signal of a prize-ball payout mechanism 1136 that pays out prize balls in compliance with a prize-ball awarding command, the signal of a game-over control mechanism 1137 that aborts the game in compliance with a game aborting command, the adjustment signal of the adjustment switch 1138 that accepts an adjustment instruction input and then produces this adjustment signal, and a card insertion signal 1139 which indicates whether or not the IC card has been inserted. By way of example, the game-apparatus display screen 130 can display the balance and the number of balls owned by the customer, excluding the balls paid out into the lent-media holder 32, or the balance and the number of owned balls in the set IC card.

As stated before, in the case of the semi-prepaid card method, the game can be executed without inserting the IC card in such a way that the note or paper money is accepted by the slit 22, whereupon the amount of money is displayed on the display unit, that when the number of game media to be lent out or the amount of money to be spent is specified, the game media are lent out, and that the paid-out amount of money is subtracted from the inserted amount of money, whereupon the resulting amount of money is displayed on the display unit.

When the manipulation element 36a of the adjustment switch of the game apparatus is depressed or when the game is over, the game execution section 131 ends the game and adjusts the stakes, and it causes the transmission/reception section 136 to transmit the data of the balance and the number of owned balls to the IC card.

In the IC card 110, the transmitted signals are picked up by the receiver 603 and are sent to the IC control circuit 119. This IC control circuit 119 causes the RAM 118 to update the data of the balance and the number of owned balls. When the updating has ended, the IC control circuit 119 causes the liquid-crystal display screen 111 to display the data. It transmits the data back to the game apparatus 120 through the transmitter 601. In the game apparatus proper 120, the transmitted data are received by the receiver 603, and the transmitted signals and the received signals are checked by the control circuit 129, which produces an IC card ejection signal after verifying that no error is involved.

The operation of updating the data in the RAM 118 may well be replaced with an expedient in which the data of the "number of owned balls" and the "balance" are cleared, and the data of the "number of owned balls" and the "balance" displayed in the game apparatus are transmitted from the transmitter of the body and sent to the IC control circuit of the IC card via the receiver thereof so as to be written into the RAM 118. In addition, the IC control circuit displays the updated or written data on the liquid-crystal display screen 111. Thereafter, the control circuit 119 commands the guide members 122 to eject the IC card in accordance with the IC card ejection signal. In the presence of the IC card ejection signal, the guide members 122 slide to eject the IC card.

Besides, in the case where the customer shifts to another game apparatus, the game apparatus proper 120 transmits a data transmission instruction in order to read out the stored information of the IC card 110, in accordance with the insertion of this IC card in the card setting port 123. When the data have been transmitted from the IC card, the necessary data such as the date and time of use, the security symbol and the No. of the game apparatus are stored in the RAM 128, and the data of the number of owned balls, the balance, etc. are sent from the control circuit 129 to the game execution section 131. When the data of the date and time of use, the security symbol, etc. have been judged unclear, the inserted IC card is returned, and the game cannot be played. When the game has ended, the controller accepts the data of the number of owned balls and the balance from the game execution section 131 and transmits the accepted data to the IC card. Besides, the displays of the "number of owned balls" and the "balance" are presented on the game-apparatus display screen 130 (the "balance display" need not be presented).

In the IC card set within the body, the AC magnetic field is externally applied to the coil of this IC card, and the capacitor is brought into the charged state during the proceeding of the game.

Next, the transmission and reception between the IC card and the game apparatus proper will be described in more detail with reference to operational flowcharts conforming to the proceeding of the game.

First, a customer sits down in front of the game machine, and inserts cash for playing the game into the slit 22 of the game-media lending machine 20. The slit 22 accepts the inserted cash so as to detect the amount of money. The amount of money on this occasion is input to the transmission/reception section 136 as the "amount of inserted money" signal 1135 shown in FIG. 6. The controller circuit 129 of the transmission/reception section 136 stores the indicated information of the "amount of inserted money" signal 1135 in the RAM 128 as the "balance", and causes the game-machine display screen 130 to display the amount of the "balance". Alternatively, when the IC card is set in the card setting port 123, the card insertion signal 1139 is output, and a start signal is transmitted to the IC card so as to perform transmission and reception required for reading out the "balance" and the "number of owned balls" stored in the IC card. After the transmission and reception, the contents stored in the IC card are read out, and the power supply of the IC card is turned "off". When the adjustment switch is depressed at the end of the game, the power supply of the IC card is turned "on", and the "balance" and the "number of owned balls" are stored in the IC card. That is, the adjustment switch is an end switch for instructing the game apparatus to end the game.

Subsequently, the customer selects and specifies the number of game media to-be-borrowed within the amount of inserted money by manipulating the lending-switch manipulation elements 23a. Then, the "lent ball" signal 1134 is output, and the controller 135 accepts the amount of money corresponding to the number of lent balls indicated by the "lent ball" signal and then judges if the accepted amount of money is within the "balance". On condition that the amount of money designated by the "lent ball" signal is within the "balance", the former is subtracted from the latter, and the content of the RAM 128 is updated to store the result of the subtraction as the new "balance". Further, the number of lent balls indicated by the "lent ball" signal is newly stored in the RAM 128 as the "number of balls". Simultaneously therewith, the balance and the number of owned balls are displayed on the game-machine display screen. Meanwhile, the prize-ball payout mechanism 1136 is commanded to operate, and it pays out the predetermined numbers of game media. When the lent-media holder 32 has consequently become full and overflown, the game media corresponding to the overflow are counted, and the number thereof is displayed as the number of owned balls on the game-machine display screen 130 together with the displayed balance.

The game is played in such a manner that the game media owned by the customer are consumed with the proceeding of the game. The "incoming ball" signal 1132 is input to the controller 135 in correspondence with each of the consumed game media. In addition, when the game medium projected by the customer wins a prize, the "prize-winning ball" signal 1133 is input to the controller 135.

The CPU 126 of the controller 135 normally executes an operation as indicated below, thereby updating the newest information of the number of owned balls in succession.

"Number of owned balls"–"Incoming ball" signals+("Prize-winning ball" signals×Rates of prize balls)=Newest number of owned balls These data are sent to the hall computer for the centralized management of the game hall, and are managed in a centralized fashion. Further, a set number for aborting the game is specified by the hall computer. When the number of owned balls has reached the set number for aborting the game, the game-over control mechanism 1137 is actuated to make further proceeding with the game impossible.

In the case where the game-over control mechanism 1137 has been actuated or where the customer wants to end the game with the particular game apparatus at their own volition, they manipulate the adjustment switch manipulation element 138. When the adjustment switch manipulation element 138 has been manipulated, the adjustment switch operates in accordance with the operational flowchart (1) to be explained below, and data after the adjustment are written into the IC card, which is thereafter ejected.

Figure 8:
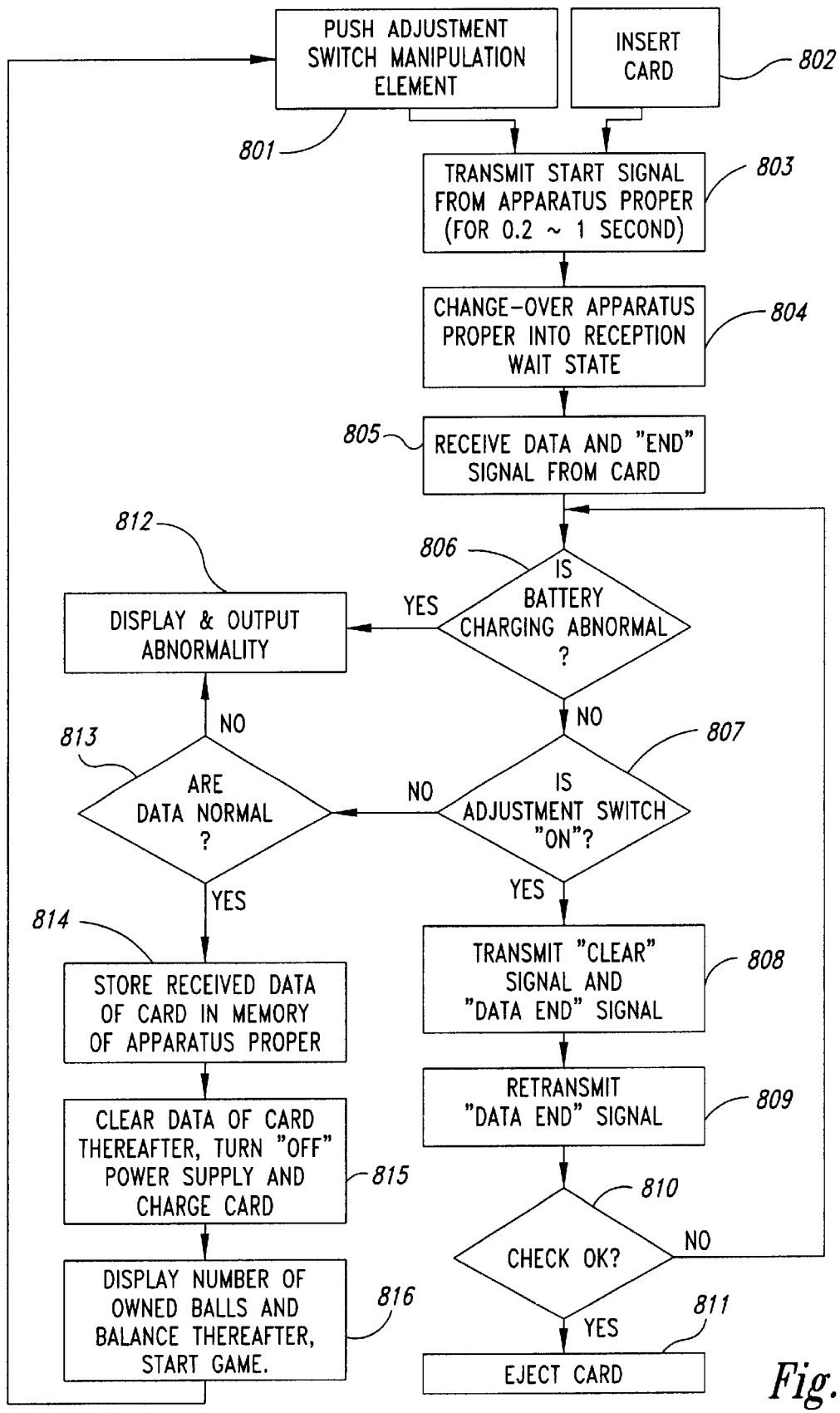
FIG. 8 is an operational flowchart of transmission/reception in the game machine as well as the IC card.

FIG. 8 illustrates the operational flowchart (1).

Referring to FIG. 8, the game is over, and the adjustment switch manipulation element 138 of the game machine is depressed (S801). Then, the control circuit 129 of the controller 135 produces a card starting signal from the transmitter 601 of the game apparatus for 0.2 second ~1.0 second (S803), and it changes-over the duplexer 602 into a state waiting for the reception of a signal from the IC card (S804). Upon accepting the card starting signal from the transmitter 601 of the game apparatus, the IC card turns the power supply "ON" and changes-over the duplexer 602 into a transmission state. Subsequently, the IC card transmits data indicative of its start, and the receiver 603 of the game apparatus receives the transmitted data (S805). In a case where the IC card is in an initial reset state, it indicates the initial state. The IC card changes-over into a reception awaiting state when it has ended the transmission. Incidentally, the data may well include data on the charged state of the battery (the capacitor). The game apparatus judges whether or not the charged state of the battery is normal (S806). In a case where the charging is not sufficient, that is, where it is less than a preset value, the control circuit 129 of the game apparatus delivers a signal indicating the charging abnormality of the IC card, to the hall computer for the centralized management of the game hall, and it simultaneously presents an abnormality display on the game-machine display screen 130 (S812). Further, in a case where an abnormality indication lamp is mounted, it is lit up to present an abnormality display. A clerk in the game hall can be made aware that the game machine is being abnormal, from the display, and can cope with the abnormality.

The game apparatus in the reception awaiting state receives the data transmitted from the IC card and indicating the started state of this IC card, and has its duplexer 602 changed-over into a transmission state again by a transmission/reception changeover signal. The control circuit 129 of the game apparatus sends out the data of the current date and time, the game machine No. of the particular game machine, the symbol concerning security, and the number of owned balls and the balance calculated as stated before.

These signals are received by the receiver 603 of the IC card 110, and they are sent to the IC control circuit 119 (S809) so as to be stored in the RAM 118. Simultaneously, the data are displayed on the liquid-crystal display screen 111 of the IC card. Although the data to be displayed consist basically of the "number of owned balls" and the "balance", they may well further include the "date and time", the "game machine No.", etc. Incidentally, the display of the "balance" is sometimes omitted.

In this state, the transmission and reception are changed-over again by the duplexer 602, and the written data are transmitted to the game apparatus, thereby checking the contents written into the IC card (S810). More specifically, the control circuit 129 includes judgement means for judging whether or not the data processing results received from the IC card by the transmitter/receiver agree with the transmitted data processing results, and the judgement means checks the agreement. After the judgement, the control circuit iterates the operations from the check of "Is battery charging abnormal?" (S806) in the presence of any error.

When the write operation for the IC card has ended as explained above, the IC card is automatically ejected (S811).

Next, there will be described operations in the case where the customer having received the ejected IC card plays the game with another game machine by the use of this IC card, reference being similarly made to FIG. 8.

The customer inserts the IC card into the card setting port 123 of the game apparatus 120 (S802). The card setting port 123 of the game apparatus detects the insertion of the IC card from outside, and delivers the card insertion signal to the controller 135. Upon accepting the card insertion signal, the control circuit 129 of the controller 135 produces the card starting signal from the transmitter 601 of the game apparatus 120 for 0.2 second ~1.0 second (S803), and it changes-over the duplexer 602 into the reception awaiting state (S804).

Upon accepting the card starting signal from the transmitter 601 of the game apparatus, the IC card turns the power supply "ON" and changes-over the duplexer 602 into the transmission state. The IC card transmits the data indicating the start thereof. It also transmits the data stored in the RAM 118 thereof. The data in the IC card include the date and time, the game machine No., the symbol concerning security, the data of the number of owned balls and the balance, and the data concerning the charged state of the battery (the capacitor).

The game apparatus in the reception awaiting state receives the data transmitted from the IC card (S805), and has its duplexer 602 changed-over into the transmission state again by the transmission/reception changeover signal. Whether or not the charged state of the battery is normal is subsequently judged (S806). When an abnormality has been found out, the abnormality signal is output from the control circuit of the game apparatus to the hall computer (S812), and the abnormality display is simultaneously presented, in the same manner as in the foregoing.

The control circuit 129 of the game apparatus judges whether or not the adjustment switch is depressed (S807). When the adjustment switch is depressed, the operations explained before are executed, and when not, it is judged that the card has been inserted.

The control circuit 129 of the game apparatus verifies the normality of the received data (S813). In the absence of any abnormality, it records the data of the IC card in the RAM 128 within the game apparatus (S814). In verifying the normality of the received data, the CRC (Cyclic Redundancy Check Code) system for error detection can be utilized for the detection of any abnormality. In this case, the transmitters/receivers of the game apparatus and the IC card are furnished with error detection means for detecting errors during the transmission and reception of information.

The number of owned balls and the balance entered in the IC card are displayed on the display screen 130 of the game machine. The control circuit 129 sends a reset signal to the IC card so as to clear the data of this IC card (S815), while the IC card has its power supply turned "OFF" and falls into a charging state. Random data or the like may well be sent instead of the reset signal so as to directly erase the data stored in the IC card.

In this state, the game is restarted (S816). When the adjustment switch stated before is depressed, the processing explained before is executed.

Besides, the transmission/reception section 136 need not always be installed in the game apparatus, but it may well be installed outside so as to transmit and receive data to and from the game apparatus.

In addition, the IC card subjected to the adjustment based on the abort is used only for exchanging the owned balls for a prize at the prize exchange. Only the IC card which has not undergone the abort can be used again for playing the game with another game machine. As shown in the operational flowchart of FIG. 8, when the IC card is inserted, all the data in this IC card are read, and they are stored and displayed in the game machine. Then, the game can be restarted.

Next, there will be described operations in the case where the game player has received the IC card and gone to the prize exchange counter, reference being made to FIG. 5 and FIG. 9.

Figure 5:
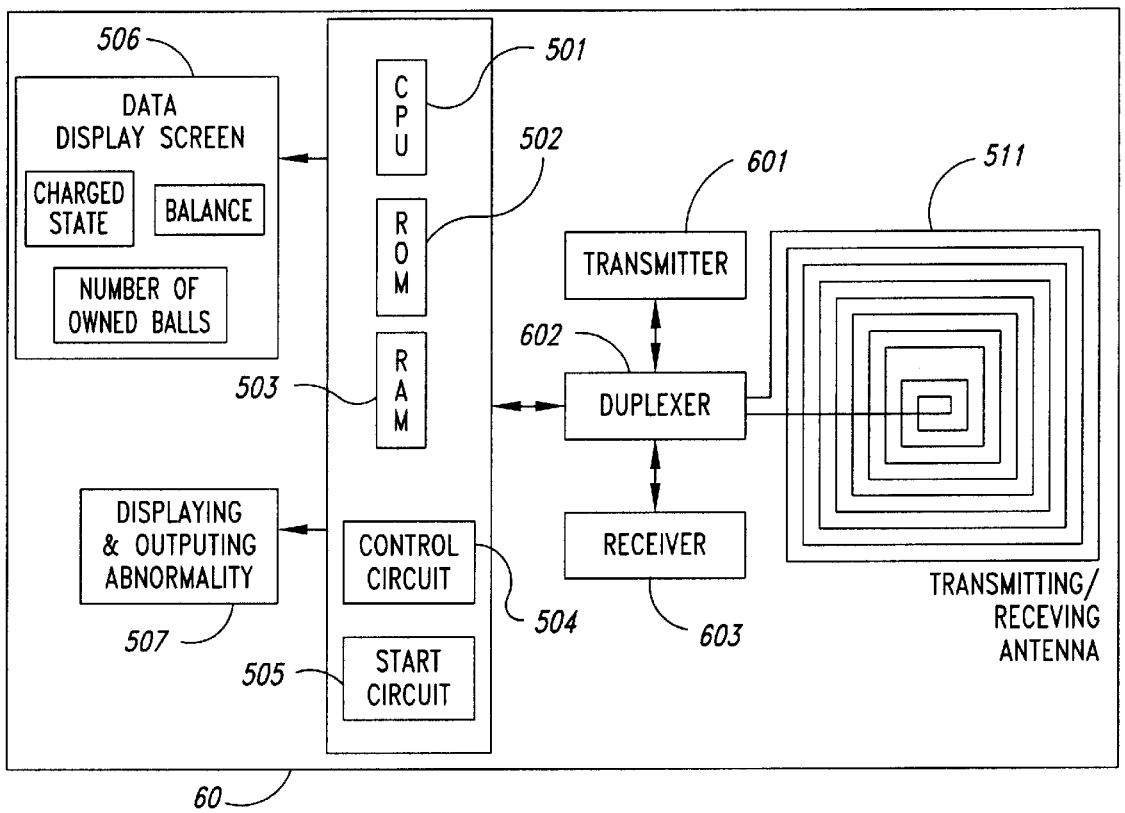
FIG. 5 is a block diagram showing the transmission/reception method of a card reading machine at a prize exchange.

FIG. 5 illustrates the block diagram of the card reading machine at the prize exchange. FIG. 9 illustrates the operational flowchart (2) at the prize exchange. Referring to FIG. 5, the card reading machine 60 which is an adjustment device is installed at the prize exchange, and it can be constructed similarly to the transmission/reception section 136 of the game apparatus. More specifically, it includes a transmitter 601 which serves to modulate transmission data and to transmit the modulated signals, a receiver 603 which receives and demodulates the signals, a duplexer 602 which serves to change-over the transmitter 601 and the receiver 603, a transmitting/receiving antenna 511, a display screen 506 which is display means for displaying the "number of game media" information, etc. stored, a CPU 501 which is processing means for performing the operations of the stored "number of game media" information, etc., a ROM 502 which is memory means for storing the programs of predetermined processing steps, etc. therein, a RAM 503 which is memory means for storing therein the "number of game media" information, etc. that are to be transmitted and received, and a control circuit 504 which is control means for controlling the transmission and reception of the transmitter/receiver and controlling the display of the display screen.

The card reading machine is also provided with a card setting port 123 which functions to set the IC card therein, guide members 122 which serve to set the IC card, and a coil 124 and a core 132 which constitute a charging circuit for charging the power supply of the IC card, these components being the same as in FIG. 1, though not shown.

Figure 9:
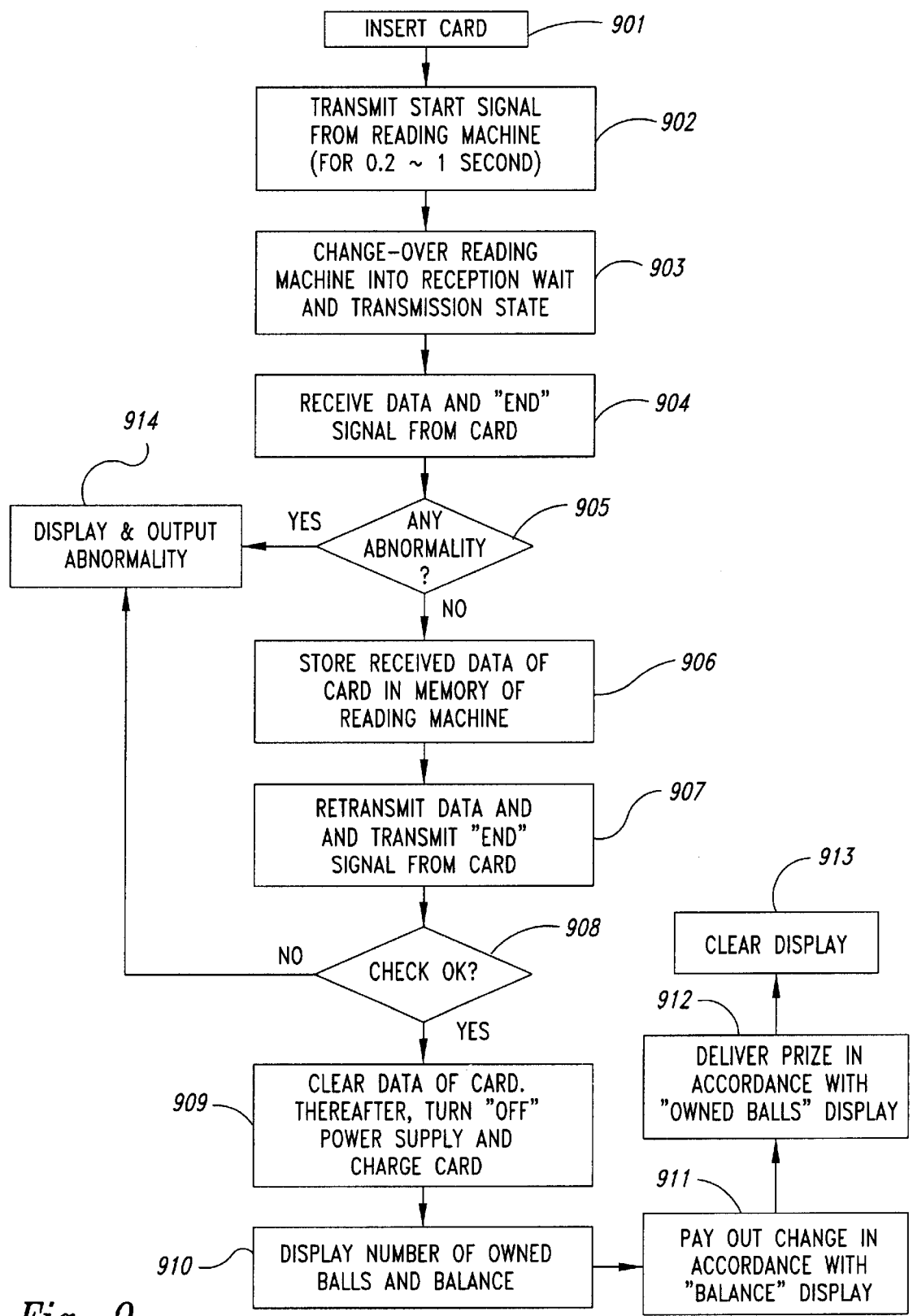
FIG. 9 is an operational flowchart of the transmission/reception of the card reading machine at the prize exchange.

Referring to FIG. 9, the IC card is inserted into the card reading machine 60 at the prize exchange (S901). Then, the card setting port 123 detects that the IC card was inserted from outside, and delivers a card insertion signal to the control circuit 504. Upon accepting the card insertion signal, the control circuit 504 produces a card starting signal from the transmitter 601 of the card reading machine 60 for 0.2 second ~1.0 second (S902), and it changes-over the duplexer 602 into a reception awaiting state (S903). Upon accepting the card starting signal from the transmitter of the card reading machine, the IC card changes-over the duplexer 602 into the transmission state. The IC card transmits the data indicating the start thereof and the data stored therein, while the receiver 603 of the card reading machine receives the transmitted data (S904). Upon ending the transmission, the IC card changes-over into the reception awaiting state. The data in the IC card include the date and time, the game machine No., the symbol concerning security, the data of the number of owned balls and the balance, and the data concerning the charged state of the battery (the capacitor). When any abnormality such as the error of the date and time or the data concerning security or the state of insufficient charging is discovered, an abnormality signal is output from the control circuit 504 of the IC card reading machine, and an abnormality display is simultaneously presented (S905). More specifically, in the case where the charging is not sufficient, the control circuit 504 of the card reading machine delivers a signal indicating the charging abnormality of the IC card, to the hall computer for the centralized management of the game hall, and it simultaneously presents an abnormality display on the screen 506 of the card reading machine (S914). Further, in the case where the abnormality indication lamp is mounted, it is lit up to present an abnormality display. Also, in the presence of any error in the received data, the control circuit displays the abnormality of the data error and outputs the notification of the abnormality.

The card reading machine 60 verifies the data transmitted from the IC card. Then, in the absence of any abnormality, the card reading machine records the data of the IC card in the RAM 503 within this machine (S906). In this state, the data of the IC card may well be retransmitted to the card reading machine 60 after changing-over the transmission and reception by means of the duplexer 602, so as to check whether or not the card data agree with the contents written in the RAM (S908).

The control circuit 504 sends a reset signal to the IC card so as to clear the data of this IC card (S909), while the IC card has its power supply turned "OFF" and falls into the charging state. The number of owned balls and the balance entered in the IC card are displayed on the display screen 506 of the card reading machine (S910). Herein, the owned balls are exchanged for a prize corresponding to the number thereof (S912), and the balance is returned (S911). When the ending instruction is accepted by the input means of the card reading machine, the display is cleared (S913), and the IC card is held as it is. This IC card is to be utilized again by another game player. It is also allowed that prizes and the numbers of owned balls to be exchanged for the respective prizes are prestored in the form of a table within the card reading machine, and that the prizes for which the owned balls can be exchanged are displayed on the occasion of the exchange for the prize by referring to the table.

Alternatively, cash, a coupon or the like may well be paid out in correspondence with the number of owned balls, instead of the prize for which the owned balls are exchanged.

Figure 4:
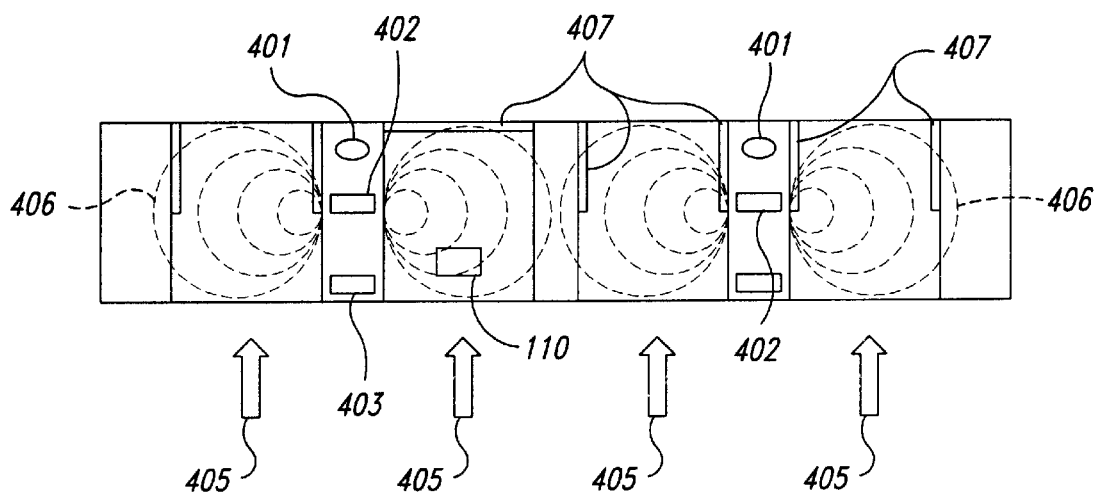
FIG. 4 is a constructional view of a gate which is installed at the entrances and exits of a game hall.

Another example of a situation at the end of the game is an occasion where the game player departs directly, carrying the IC card, and without going to the prize exchange corner when he/she has obtained the IC card ejected by depressing the adjustment switch, because of the null balance and a small number of owned balls. On this occasion, an expedient for requesting the game player to return the IC card is a method in which entrance/exit monitoring devices are installed. FIG. 4 illustrates the constructional view of the entrance/exit monitoring devices. In FIG. 4, each of the entrance/exit monitoring devices which are installed at a gate being the entrance/exit parts of the hall includes a transmitter/receiver 402 which transmits and receives by radio to and from the storage medium lying within a predetermined extent, a controller which controls the transmission and reception of the transmitter/receiver, detection means for detecting the withdrawal of the storage medium from the game hall, a card returning machine 403 which serves to return the card, a loudspeaker 401 which is output means, and a door controller which is arranged at the entrance/exit of the game hall and which controls the opening and shutting of a door at the entrance/exit.

In FIG. 4, the radio waves of a monitoring signal are intermittently generated by the transmitters of the transmitters/receivers 402 at the gate which forms the entrances/exits of the hall. When the game player carrying the IC card 110 approaches the gate, the IC card 110 picks up the radio wave, and the transmitter of the IC card 110 generates a response signal bearing the identification information of the IC card. In a case where the receiver of the gate has received the response signal from the storage medium, the detection means judges the takeout of the storage medium from the game hall. Then, the door controller shuts the gate 407 automatically, and an output is produced requesting the game player to return the IC card 110 into the card returning machine 403. As an alternative measure, in the case where the receiver of the transmitter/receiver 402 at the gate has received the response signal, the output is produced requesting the game player to return the IC card 110 into the card returning machine, and the gate 407 is automatically shut after the lapse of a fixed time period. As a method for the output, the loudspeaker 401 or the like is mounted, and a vocal output such as "PLEASE RETURN THE IC CARD INTO THE CARD RETURNING MACHINE" is emitted from the loudspeaker 401. It is also allowed that display means is mounted for similarly displaying the output with characters, or that an indication lamp is flickered.

When the IC card 110 is returned into the card returning machine 403, the response signal produced from the IC card 110 is verified by the receiver in the card returning machine, and the gate 407 is thereafter opened.

The transmitter/receiver 402 may well include a transmission portion and a reception portion separately. In a case where an antenna is shared, the transmission and reception may well be changed-over in time division.

Also, a display such as "WHEN GOING OUT, PLEASE EXCHANGE IC CARD FOR A PRIZE AT THE PRIZE EXCHANGE OR RETURN IT INTO THE CARD RETURNING MACHINE AT THE ENTRANCE/EXIT" may well be presented on the display screen of the IC card 110.

As described above, according to this embodiment, the same card can be recycled after having been exchanged for the prize at the prize exchange or after having been returned into the card returning machine.

Moreover, then reading and writing data from and into the card, the data are not read and written directly by read and write circuits, but they are transferred by radio communication, so that inferior contact of the card is not a problem. Furthermore, the data are resent so as to check them, or an error check such as CRC is performed, whereby the data can be reliably transmitted and received.

What is claimed is:

1. An adjustment device having adjustment means for adjusting stakes for a game machine, comprising:
    an adjustment-device receiving unit which receives information from a storage medium which is used in a game and stores information for the game machine;
    an adjustment-device controller which controls reception of the adjustment-device receiving unit; and an adjustment-device output unit which, at least, outputs the information received by said adjustment-device receiving unit, wherein:

said adjustment-device receiving unit includes an adjustment-device setting port in which said storage medium is inserted, an adjustment-device receiver which receives by radio information from the storage medium inserted in said adjustment-device setting port, and a charging circuit for charging a power supply circuit of the storage medium inserted in said adjustment-device setting port; and said adjustment means adjusts the stakes on the basis of information received by said adjustment-device receiver.

2. An adjustment device having adjustment means for adjusting stakes for a game machine, comprising:

an adjustment-device transmission/reception section which transmits and receives information to and from a storage medium which is used in a game and stores information for the game machine;

an adjustment-device controller which controls transmission and reception of the adjustment-device transmission/reception section; and an adjustment-device output unit which, at least, outputs the information received by said adjustment-device transmission/reception section, wherein:

said adjustment-device transmission/reception section includes an adjustment-device setting port in which said storage medium is inserted, an adjustment-device transmitter/receiver which transmits and receives by radio information from the storage medium inserted in said adjustment-device setting port, and a charging circuit for charging a power supply circuit of the storage medium inserted in said adjustment-device setting port; and said adjustment means adjusts the stakes on the basis of information transmitted and received by said adjustment-device transmitter/receiver.

3. An adjustment device as defined in claim 2, wherein said charging circuit further includes magnetic-field generation means for generating a magnetic field.

4. An adjustment device as defined in claim 2, wherein said adjustment-device transmitter/receiver includes error detection means for detecting any error during the transmission and reception of the information.

5. An adjustment device as defined in claim 2, wherein said charging circuit can perform the charging even during the transmission and reception to and from said storage medium.

6. An adjustment device as defined in claim 2, wherein:

said adjustment-device setting port includes means for detecting said storage medium in the adjustment-device setting port; and when the insertion of said storage medium has been detected in the adjustment-device setting port, said adjustment-device controller gives a command to the storage medium through said adjustment-device transmitter/receiver so as to transmit the information stored in the storage medium.

7. An adjustment device as defined in claim 2, wherein said adjustment-device controller gives a command to said storage medium through the adjustment-device transmitter/receiver so as to erase the information stored in the storage medium.

8. An adjustment device as defined in claim 2, wherein said adjustment-device controller gives a command to said storage medium through the adjustment-device transmitter/receiver so as to "OFF"/"ON" operate a power supply of the storage medium.

* * * * *